United States Patent
Jang et al.

(10) Patent No.: US 8,649,162 B2
(45) Date of Patent: Feb. 11, 2014

(54) DISPLAY DEVICE WITH A LENS PLATE AND METHOD OF MANUFACTURING THE DISPLAY DEVICE

(75) Inventors: Jae-Woo Jang, Suwon-si (KR); Jin-Ho Cho, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 319 days.

(21) Appl. No.: 12/878,832

(22) Filed: Sep. 9, 2010

(65) Prior Publication Data

US 2011/0058349 A1    Mar. 10, 2011

(30) Foreign Application Priority Data

Sep. 9, 2009  (KR) .................. 10-2009-0084949

(51) Int. Cl.
*G06F 1/16*  (2006.01)
*H05K 5/00*  (2006.01)
*H05K 7/00*  (2006.01)
*H02B 1/01*  (2006.01)

(52) U.S. Cl.
USPC ............. 361/679.02; 361/679.21; 361/829

(58) Field of Classification Search
USPC ......... 174/50; 361/690, 681, 679.02, 679.21, 361/145, 704, 829; 29/530; 312/223.1; 349/58–65, 70, 73, 112; 345/58, 905; 248/50, 346.04, 346.5, 917, 918; 348/794, 836; 362/29, 30, 97, 362/216–225, 260, 330, 390, 396, 560, 561, 362/600, 604, 611–614, 616, 623, 632, 633, 362/634; 359/48, 82, 83, 88
See application file for complete search history.

(56) References Cited

U.S. PATENT DOCUMENTS

| | | | |
|---|---|---|---|
| 6,847,417 B2 * | 1/2005 | Kim | 349/58 |
| 6,950,154 B2 * | 9/2005 | Lee | 349/58 |
| 7,259,810 B2 * | 8/2007 | Kim | 349/67 |
| 7,432,996 B2 * | 10/2008 | Ioki et al. | 349/58 |
| 7,787,071 B2 * | 8/2010 | Nishio et al. | 349/58 |

FOREIGN PATENT DOCUMENTS

| | | | |
|---|---|---|---|
| JP | 2000221482 A | 8/2000 |
| JP | 2003121816 A | 4/2003 |
| JP | 2003-322824 A | 11/2003 |
| KR | 1020080098619 A | 11/2008 |

* cited by examiner

*Primary Examiner* — Hoa C Nguyen
*Assistant Examiner* — Binh Tran
(74) *Attorney, Agent, or Firm* — Innovation Counsel LLP

(57) ABSTRACT

The present invention provides a display device comprising a top chassis including first plate and a second plate extended and bent down from the first, a lens plate disposed below the first plate, a first frame supporting a peripheral area of the lens plate, a display panel disposed below the first frame, a backlight unit supporting a peripheral area of the display panel, and a chassis fixing member fixing the top chassis to the backlight unit. The first frame includes a first surface facing an inner surface of the first plate and a second surface facing an inner surface of the second surface.

20 Claims, 4 Drawing Sheets

DISPLAY DEVICE WITH A LENS PLATE AND METHOD OF MANUFACTURING THE DISPLAY DEVICE

This application claims priority, and all the benefits accruing there from under 35 U.S.C. §119, to Korean Patent Application No. 10-2009-0084949, filed on Sep. 9, 2009, the contents of which are herein incorporated by reference in their entirety.

BACKGROUND

1. Field of the Invention

The present disclosure relates to a display device with a lens plate and method of manufacturing the display device. More particularly, the present disclosure relates to a display device with a lens plate which is easy to manufacture and reduces possibilities of causing defects, and producing method of the display device

2. Description of the Related Art

Display devices that have display panels such as liquid crystal display panels, plasma display panels, or organic light emitting display panels, are widely used.

A lens plate may be disposed in front of such a display panel in a display device to achieve a special function.

For example, a lens plate can be used in a three-dimensional display device. The lens plate transmits images provided by the display panel in a number of different directions to achieve three-dimensional display. Various kinds of patterns may be formed on the lens plate, and such patterns determine the characteristics of the three-dimensional image.

In conventional display devices that have a lens plate, the lens plate is fixed to the display panel by a spacer. The spacer is disposed between the lens plate and the display panel. An adhesive material is used to attach the spacer to the display panel and to the lens plate. The alignment and distance between the lens plate and the display panel are important factors that decide the quality of the three-dimensional image. In particularly misalignment between the lens plate and the display panel may significantly degrade the quality of the three-dimensional display. In the case of large display devices, such as TVs and public information displays, the display panel and the lens plate are both bigger and heavier, so it is more difficult to fix the lens plate to the display panel without misalignment. When misalignment is introduced during the assembly process, reprocessing steps may be required to properly fix the lens plate to the display device. Such reprocessing steps may include steps of detaching the spacer from the lens plate or the display panel, and reattaching the spacer to the lens plate or the display panel, to correct an alignment defect between the lens plate and the display panel. Detaching and reattaching the spacer is typically very difficult because of the characteristic of the adhesive material. Also, additional difficulties may occur when the assembly process is automated, because the alignment process sometimes requires fine adjustments, which are not amenable to automation.

BRIEF SUMMARY OF THE INVENTION

A display device is provided that includes a top chassis having first plate and a second plate extended and bent down from the first plate, a lens plate disposed below the first plate, a first frame supporting a peripheral area of the lens plate, a display panel disposed below the first frame, a backlight unit disposed below and providing light to the display panel. The first frame may include a first surface facing an inner surface of the first plate and a second surface facing an inner surface of the second surface.

In another aspect, a method for producing a display device is provided. The method includes disposing a lens plate on a first frame, fixing the first frame with the lens plate to a top chassis to form a top chassis unit, and fixing the top chassis unit to a backlight unit having a display panel disposed thereon.

In another aspect, a display device is provided that includes a display panel, a first frame including an opening and covering a peripheral area of the display panel, a lens plate disposed on the first frame, a backlight unit supporting a peripheral area of the display panel and providing light and a top chassis covering a peripheral area of the lens plate and coupled to the backlight unit. The backlight unit may include a light source generating light, a light guiding member guiding the light to the display panel, bottom chassis receiving the light source and the light guiding member and a second frame covering a peripheral area of the light guiding member and supporting a peripheral area of the display panel. The bottom chassis may include a base plate and a sidewall extended from the base plate. The second frame may contact an outer surface of the sidewall. The top chassis may include a first plate facing an upper surface of the first frame and a second plate facing a side surface of the first frame.

It is to be understood that both the foregoing general description and the following detailed description are exemplary and explanatory.

BRIEF DESCRIPTION OF THE DRAWINGS

The above and other aspects, features, and advantages will become more apparent by describing in detail the exemplary embodiments thereof with reference to the attached drawings in which.

DETAILED DESCRIPTION OF THE INVENTION

Figure 1:
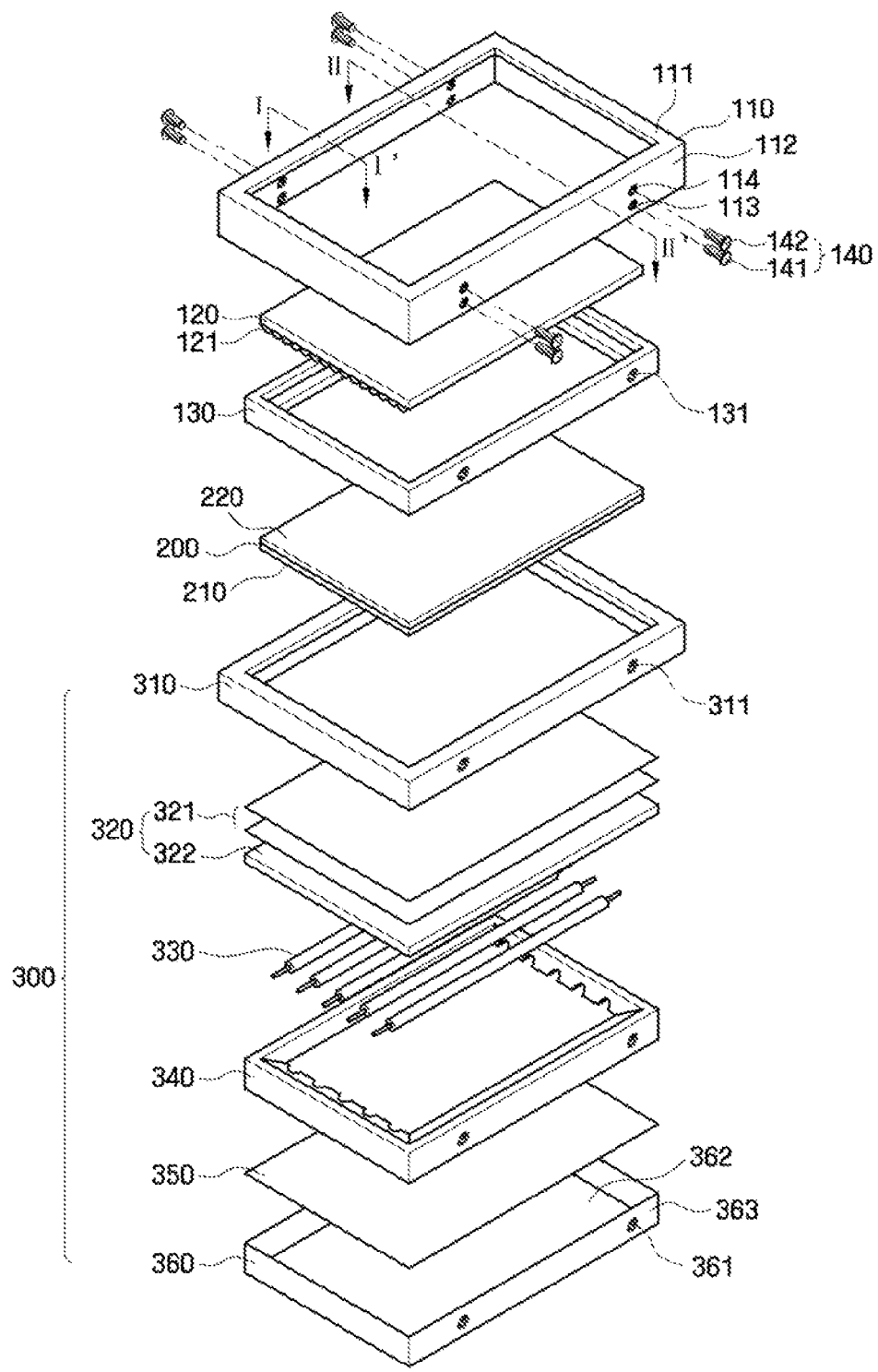
FIG. 1 is an exploded perspective view showing a display device according to an exemplary embodiment.

Hereinafter, embodiments will be described in detail with reference to the accompanying drawings. The present invention may, however, be embodied in many different forms and should not be construed as limited to the exemplary embodiments set forth herein. In the drawings, the size and relative sizes of layers and regions may be exaggerated for clarity.

FIG. 1 is an exploded perspective view showing a display device according to an exemplary embodiment. Referring to FIG. 1, the display device includes a top chassis 110, lens plate 120, a first frame 130, display panel 200, backlight unit 300 and chassis fixing member 140. The backlight unit 300 includes a second frame 310, a light guiding member 320, a third frame 340, a reflective sheet 350 and bottom chassis 360.

The top chassis 110 includes a first plate 111 covering a peripheral area of the lens plate 120 and a second plate 112 extended from the first plate 111 and bent down (i.e., in the direction of the position of backlight unit 300 as shown in the exploded perspective view of FIG. 1). The first plate 111 is a rectangular frame having an opening in a center thereof and the second plate 112 is extended from each side of the rectangular frame.

The top chassis 110 may be made, for example, by assembling a plurality of plates into first plate 111 to form a frame having an opening. Second plates 112 are bent down and extend from each of the first plates.

Lens plate 120 is disposed below the first plate 111. Elliptical patterns 121 are formed on a lower surface of the lens plate 120. The elliptical patterns 121 refract display images provided by the display panel 200 by several angles to provide several view points. The images provided from the lens plate 120 to each of the view points are different from each other because the lens plate 120 transmits images that originate from different pixels of the display panel 200 to different view points. As a result, the display device with the lens plate 120 could provide, for example, three dimensional images.

A variety of patterns such as a dome shape or a prism shape may be provided as patterns 121 for the lens plate 120.

The patterns of the lens plate 120 may also, or alternatively, be formed on an upper surface of the lens plate 120 and/or inside of the lens plate 120.

The feature and quality of the three dimensional display images provided by the display device are determined, in part, by the design of the pixels in the display panel 200 and shapes of the pattern. Also, the alignment between the display panel 200 and the pattern 121 of the lens plate 120, and distance between the display panel 200 and the lens plate 120 are important factors in determining the refraction angles of the images of each pixels and the quality of the three dimensional images. Thus, it is important that the pattern 121 of the lens plate 120 is properly designed and distance between the display panel 200 and the lens plate 120 is properly set.

The first frame 130 is disposed below the lens plate 120 and supports a peripheral area of the lens plate 120. A cushion tape or silicon may be disposed on an area of the first frame 130 that faces a lower surface of the lens plate 120 to function as a shock absorption member. The shock absorption member reduces any shock to the lens plate 120 that may be transferred from the first frame 130.

The first frame 130 may be fixed to the top chassis 110 by a fixing member.

The display panel 200 is disposed below the first frame 130. The display panel 200 may include, for example, a thin film transistor substrate 210 and a color filter substrate 220.

The backlight unit 300 is disposed below the first frame 130 and display panel 200 and provides light to the display panel 200.

The second frame 310 of backlight unit 300 supports a peripheral area of the display panel 200. A shock absorption member may be disposed on an area of the second frame 310 that faces a lower surface of the display panel 200 to protect the display panel 200 from an external shock to the second frame 310.

The light guiding member 320 is disposed below the second frame 310. The light guiding member may include optical sheets 321 and an optical plate 322. The optical plate 322 receives light provided from the light source 330, diffuses the light and guides the light to the optical sheet 321. The optical sheet 321 may diffuse and collimate the light, and guides the light to the display panel 200. The light guiding member 320 may include a variety of structures for guiding the light provided from the light source 330. The optical sheets 321 may be attached to an upper surface of the optical plate to simplify the assembly process of the display device.

The light source 330 is disposed below the light guiding member 320 and generates light. The light source 330 may include lamps or light emitting diodes.

The third frame 340 is disposed below the light guiding member 320 and supports a peripheral area of the light guiding member 320. The third frame 340 may cover a side surface of the light source 330. If the light source 330 is a lamp, the third frame 340 may have a groove corresponding to a cross-sectional shape of the lamp.

An inner surface of the third frame 340 may be inclined to outside of the third frame 340 to reflect light provided from the light source 330 in a direction where the light guiding member 320 is disposed.

The reflective sheet 350 is disposed below the light source 330 and reflects light provided from the light source 330 to an upper area. The reflective sheet 350 may cover the whole area of the base plate 362 of the bottom chassis 360.

An end portion of the reflective sheet 350 may be bent upward and attached to an upper surface of the sidewall 363 of the bottom chassis 360.

Meanwhile, if the light source 330 includes a light emitting diode and a substrate that the light emitting diode is mounted on, the reflective sheet 350 may be attached to an upper surface of the substrate and have a hole exposing the light emitting diode.

The bottom chassis 360 receives the light guiding member 320, the light source 330, the second frame 310, the third frame 340 and the reflective sheet 350. The bottom chassis 360 is coupled to the top chassis 110 and protects the units that constitute the display device.

Figure 2:
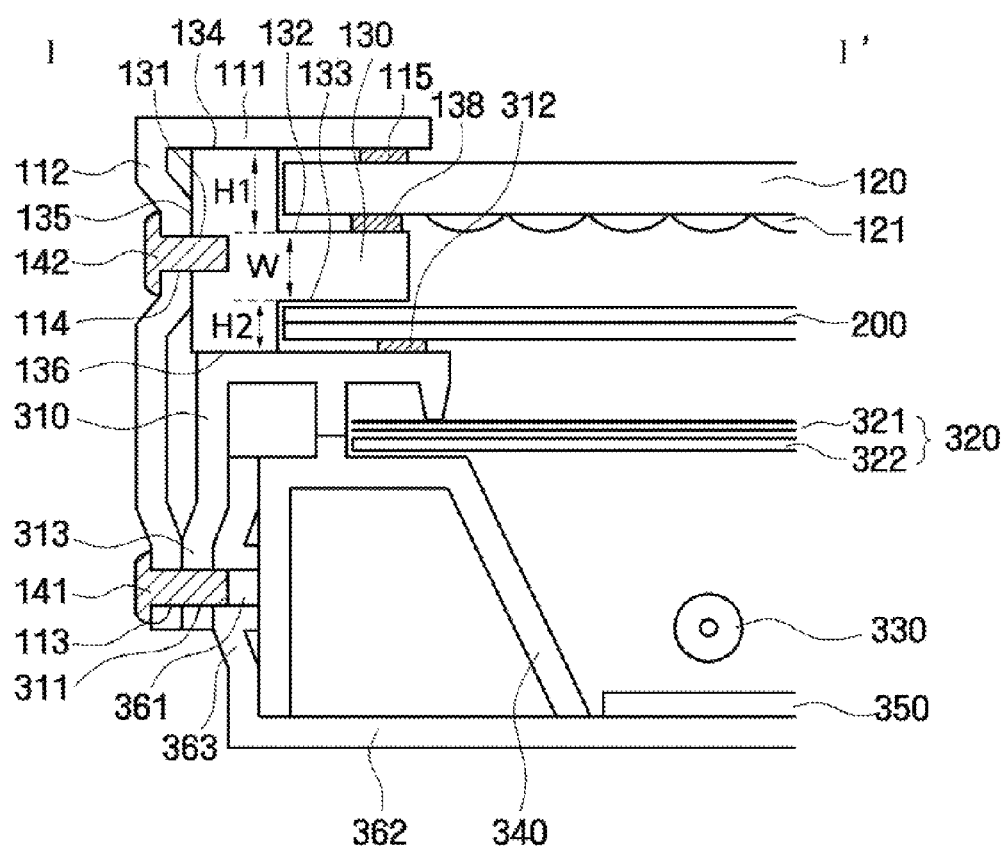
FIG. 2 is a cross-sectional view showing the display device of FIG. 1.

FIG. 2 is a cross-sectional view showing the display device of FIG. 1. Referring to FIG. 2, the first frame 130 includes a first receiving recess 132 for receiving the lens plate 120 and a second receiving recess 133 for covering a peripheral area of the display panel 200. The receiving recesses 132,133 are formed on the first frame 130 opposite to each other, so the cross-section of first frame 130 may include a shape of a 'T' (which in this view is rotated by 90 degree).

The peripheral area of the lens plate 120 is disposed in the first receiving recess 132. A shock absorption member 138 may be disposed between the lens plate 120 and the first receiving recess 132.

An upper surface 134 of the first frame 130 faces and may contact an inner surface of the first plate 111. A side surface 135 of the first frame 130 faces and may contact an inner surface of the second plate 112. This structure prevents the first frame 130 from being moved unexpectedly in the top chassis 110 and from being twisted by an external force.

The lower portion of the first frame 130 includes a lower surface 136 that contacts an upper surface of the second frame 310 and a second receiving recess 133 that covers a peripheral area of the display panel 200. The second receiving recess 133 protects the peripheral area of the display panel 200 and intercepts light leaked from the peripheral area of the display panel 200. The second receiving recess 133 makes it possible to strongly couple the first frame 130 with the second frame 310 without affecting the display panel 200.

The distance in the display device between the lens plate 120 and the display panel 200 may be easily controlled by simply changing the first frame 130 to another first frame having a different thickness. The distance between the lens plate 120 and the display panel 200 depends upon the thickness 'W,' which is the distance between the first recess 132 and the second recess 133 on first frame 130 (i.e., the thickness of the lower part of the 'T'). So using a frame with a different value of the thickness W will change the distance between the lens plate 120 and display panel 200. Also, it is easy to align the lens plate 120 with the display panel 200 because the first receiving recess 132 and the second receiving recess 133 guide the lens plate 120 and the display panel 200. So it is possible to simplify and speed up the assembly process.

Dimensions on the first frame 130 include the height H1 of the first recess 132 and the height H2 of the second recess 133. In an exemplary embodiment, H1 may be set to correspond to a width of the lens plate 120, so that when the lens plate 120 is received in the first recess 132, the first frame 130, the top chassis 110 and, if included, the shock absorption members 115, 138, secure the lens plate 120. H2 may be set to correspond to a width of the display panel 200, so that when the display panel 200 is received into the second recess 133, the first frame 130, the second frame 310 and, if included, shock absorption member 312, secure the display panel 200.

A side surface 135 of the first frame 130 may include a hole 131 for fixing the first frame 130 to the top chassis 110. The second plate 112 also has a hole 114 in a position that corresponds to the position of hole 131 of the first frame 130. The first frame fixing member 142 is coupled to the holes 131,114 to fix the first frame 130 to the top chassis 110. The first frame fixing member 142 may include a screw and a spiral shaped guiding groove may be formed in at least one of the holes 114,131.

By coupling the holes 114, 131 in the top chassis 110 and first frame 130, the first frame fixing member 142 creates a unitary top chassis unit from the top chassis 110, lens plate 120 and the first frame 130. The unitary top chassis unit may be prepared before the actual assembly process for the display device, and in particular the unitary top chassis unit may be prepared before the step of fixing the top chassis 110 to the bottom chassis 360. So the assembly process of the display device can be more flexible and it is possible to reduce the time of the actual assembly process.

The second plate 112 of the top chassis 110 may include a hook that makes it possible for the top chassis 110 to fix the first frame 130 without using the first frame fixing member 142.

A shock absorption member 115 may be disposed between the first frame 130 and the lens plate 120, and prevent inflow of particles from outside of the display device.

The second frame 310 supports a peripheral area of the display panel 200. The second frame 310 includes an upper surface, a portion of which faces a lower surface of the peripheral area of the display panel 200, and a portion of which contacts a lower surface of the first frame 130. A shock absorption member 312 may be disposed between the second frame 310 and the display panel 200. The second frame 310 includes a portion 313 that is disposed between the sidewall 363 of the bottom chassis 360 and the second plate 112. Holes 311,113, 361 are formed on a portion 313 of the second frame 310, and portions of the second plate 112 and the sidewall 363 in positions that corresponds to the position of hole 311 in portion 313 of the second frame 310. The chassis fixing member 141 is passed into and is coupled to the holes 311, 113, 361, and thus the top chassis 110, the second frame 310 and the bottom chassis 360 are coupled to each other. The chassis fixing member 141 is coupled to the holes 311,113, 361 at the same time, without any additional fixing member, so process time can be reduced during manufacturing.

The chassis fixing member 141 in the present embodiment comprises a screw, and a spiral shaped guiding groove may be formed in one of the holes 311,113,361.

The chassis fixing member 141 may include a variety of fixing members such as, for example hooks and rivets.

The distance between the lens plate 120 and the display panel 200 may also be controlled by adjusting the distance between the holes 113,114 without substitute the first frame 130 with another first frame having different thickness W. The display panel 200 is disposed on the second frame 310 and the lens plate 120 is disposed on the first frame 130. The first frame 130 is fixed to the top chassis 110 and the second frame is fixed to the bottom chassis 360. If the distance between the holes 113,114 is increased, the distance between the first frame 130 and the second frame 310 is increased. So the distance between the lens plate 120 and the display panel 200 can be decided by the distance between the holes 113,114.

Figure 3:
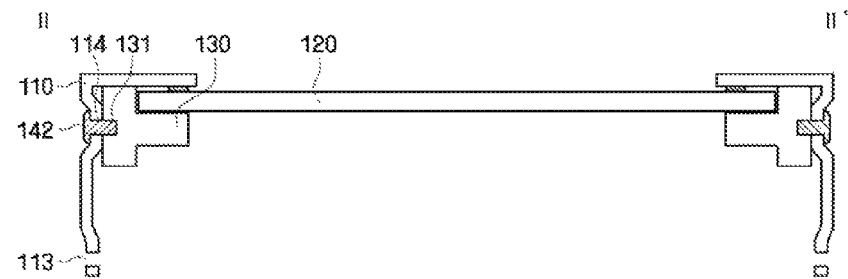
FIG. 3 is a cross-sectional view showing a method for manufacturing a display device according to an exemplary embodiment.
Figure 3:
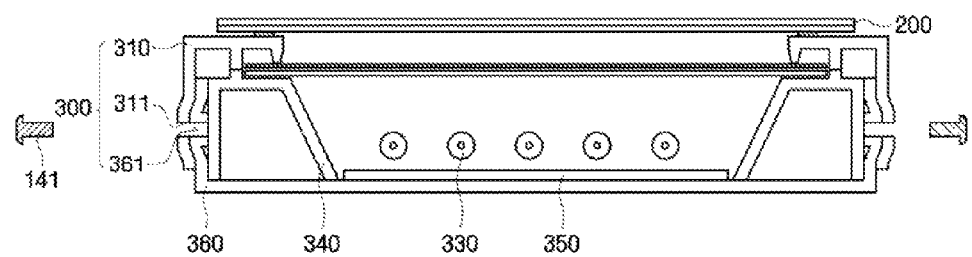

FIG. 3 is a cross-sectional view taken along line II-II' shown on FIG. 1 for illustrating a method of manufacturing a display device according to an exemplary embodiment.

Referring to FIG. 3, the lens plate 120 is disposed on the first frame 130. The first frame 130 is fixed to the top chassis 110 by the first frame fixing member 142. So the lens plate 120, the first frame 130 and the top chassis 110 form a top chassis unit. The top chassis unit is easy to move because the constituent members such as the lens plate 120, the first frame 130 and the top chassis 110 are fixed strongly to each other. The top chassis 110 may be held and moved by a jig with ease, and thus the top chassis unit can be easily moved in automated assembly process by a jig.

The display panel 200 disposed on the backlight unit 300. The backlight unit 300 is disclosed above with respect to FIGS. 1 and 2

The top chassis unit is moved to an upper area of the backlight assembly 300 by a jig and disposed on the backlight assembly 300, after the display panel 200 is disposed on the backlight unit 300. When the top chassis unit is disposed on the backlight unit 300, the center of the hole 113 of the top chassis 110 and the center of the hole 311 of the second frame 310 are on a same virtual line. After the top chassis unit is disposed on the backlight unit 300, the chassis fixing member 141 is coupled to the holes 113, 311, 361 in that order.

The assembly process described above is different from an assembly process of the display device that includes a spacer attached to the display panel 200 and the lens plate 120. In the present exemplary embodiment, the lens plate 120 is aligned with the display device when the lens plate 120 is fixed to the first frame 130. An additional process for aligning the lens plate 120 to the display panel 200 is not necessary in the assembly process of the display panel 200 including the first frame 130, because the first frame 130 fixes and aligns the lens plate 120. Also, reprocessing, which includes a step disassembling the lens plate 120, is simplified because the lens plate 120 is not attached to the display panel 200 by a spacer.

Figure 4:
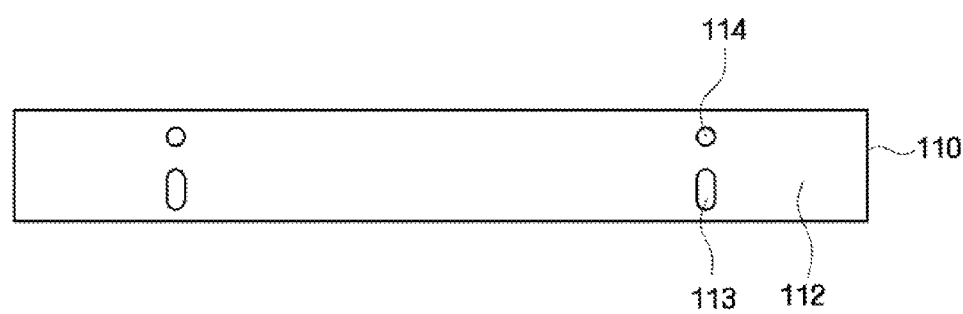
FIG. 4 is a side view showing a top chassis according an exemplary embodiment.
Figure 5:
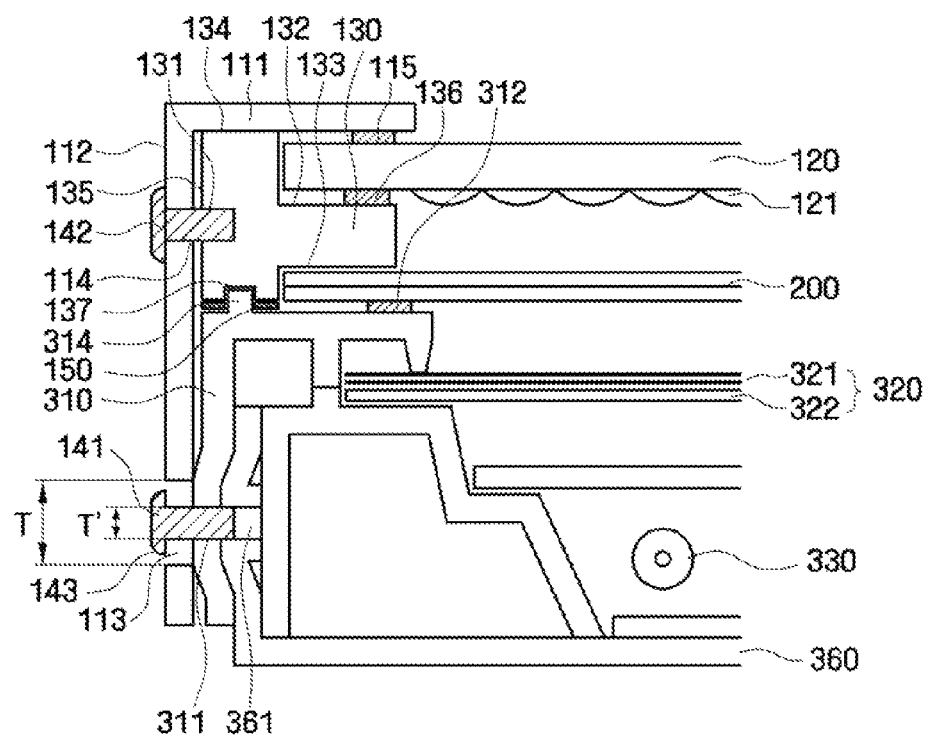
FIG. 5 is a cross-sectional view showing a display device according to an exemplary embodiment.

FIG. 4 is a side view showing a top chassis according an exemplary embodiment. FIG. 5 is a cross-sectional view showing a display device according to an exemplary embodiment.

Referring to FIG. 4, the second plate 112 of the top chassis 110 includes a first hole 114 for being coupled to a first frame fixing member 142 and a second hole 113 for being coupled to a chassis fixing member 141. The second hole 113 may have a rod shape. A width of the second hole 113 in a first direction is smaller than a width of the second hole 113 in a second direction that is perpendicular to the first direction. Therefore, when the top chassis 110 is fixed to the bottom chassis 360 by a chassis fixing member 141, the position of the top chassis 110 can be adjusted up and down along the second hole 113 in the second direction. So a distance between the lens plate 120 and the display panel 200 may be controlled by the second hole 113 and the chassis fixing member 141.

Referring to FIG. 5, the chassis fixing member 141 passes through the second hole 113 of the second plate 112 of the top chassis 110 and is coupled to the hole 311 of the second frame 310 and the hole 361 of the bottom chassis 360.

A diameter of a head portion 143 of the chassis fixing member 141 is bigger than the width of the second hole 113 in the first direction, so the head portion 143 pushes an outer surface of the second plate 112 close to the second hole 113 to fix the top chassis 110.

If the width of the second hole 113 in a longitudinal direction is defined as T and the diameter of the chassis fixing member 141 is defined as T', movable ranges of the top chassis 110 is defines as T-T'. So it is possible to control the distance between the top lens plate 120 and the display panel 200 precisely.

If the first frame 130 and the second frame 310 stably contact each other, a shock to one of the frames 130,310 is not dispersed effectively to both of the frames 130,310 and the possibility of the frames 130,310 being twisted or deviated may increase.

The second frame 310 according to the present exemplary embodiment includes a protrusion 314 formed on an upper portion thereof, and the first frame includes an aperture 137 positioned to correspond to the position of protrusion 314. The height of the protrusion 314 may be the same as or bigger than the movable range of the top chassis 110, T-T'. The protrusion 314 and the aperture 137 allow the first frame 130 and the second frame 310 to stay in physical contact with each other. Although there is a gap between the first and second frames 130, 310, the physical contact between them made by the protrusion 314 and the aperture 137 prevent the first and second frames 130, 310 from twisting or becoming misaligned.

The display device according to an exemplary embodiment, may further include a distance adjustment member 150 allow the distance between the lens plate 120 and the display panel 200 to be easily controlled and to disperse shocks to the display device. The distance adjustment member 150 may include a hole which the protrusion 314 is inserted into. The distance adjustment member 150 may have a number of different thicknesses, so that the distance between the first and second frames 130, 310 can be controlled by the distance adjustment member 150.

The distance adjustment member 150 may be stacked on each other to offer multiple thicknesses.

The distance adjustment member 150 may fill up a space between the first frame 130 and the second frame 310, close to the protrusion 314 to increase the area of contact between the first and second frames 130, 310.

Although the invention has been described with reference to the accompanying drawings and the exemplary embodiments, the invention is not limited thereto. Therefore, it should be noted that various changes and modifications may be made without departing from the technical spirit and scope of the disclosure including the appended claims.

What is claimed is:

1. A display device comprising:
   a top chassis including a first plate and a second plate extended and bent down from the first plate;
   a lens plate disposed below the first plate;
   a first frame supporting a peripheral area of the lens plate, the first frame including a first surface facing an inner surface of the first plate and a second surface facing an inner surface of the second plate;
   a display panel disposed below the first frame; and
   a backlight unit disposed below and providing light to the display panel,
   wherein the first frame includes a first frame hole having an opening on the second surface and surrounded on three sides by the first frame, the first frame hole positioned in a middle portion of the first frame adjacent and extending parallel to a supporting portion of the first frame extended between the lens plate and the display panel.

2. The display device of claim 1, wherein the backlight unit further comprises a second frame supporting a peripheral area of the display panel and a bottom chassis coupled to the second frame.

3. The display device of claim 2, further comprises a protrusion formed on an upper surface of the second frame and an aperture formed on a lower surface of the first frame.

4. The display device of claim 3, further comprises a distance adjustment member disposed between the first frame and the second frame.

5. The display device of claim 2, further comprises a top chassis fixing member fixing the chassis to the backlight unit.

6. The display device of claim 5, wherein the second frame comprises a portion disposed between the second plate of the top chassis and a sidewall of the bottom chassis, and the second frame, the second plate and the sidewall each include a hole that has a shape that corresponds to a shape of the chassis fixing member.

7. The display device of claim 6, wherein a width of the hole of the second frame in a first direction is smaller than a width of the hole of the second frame in a second direction.

8. The display device of claim 6, wherein the chassis fixing member comprises a screw and a spiral shaped guiding groove is formed on at least one of the holes of the second frame, the second plate and the sidewall.

9. The display device of claim 1, further comprising a first frame fixing member fixing the first frame to the top chassis.

10. The display device of claim 9, wherein the second plate of the top chassis includes a second plate hole that has a shape that corresponds to a shape of the first frame fixing member.

11. The display device of claim 9, wherein the first frame fixing member comprises a screw and a spiral shaped guiding groove is formed on at least one of the holes of the second plate and the first frame.

12. The display device of claim 1, wherein a cross section of the first frame comprises a shape of a 'T'.

13. The display device of claim 1, wherein the first surface of the first frame contacts the inner surface of the first plate and the second surface contacts the inner surface of the second plate.

14. A method for producing a display device, comprising the steps of:
   disposing a lens plate on a first frame;
   fixing the first frame with the lens plate to a top chassis to form a top chassis unit; and
   fixing the top chassis unit to a backlight unit having a display panel disposed thereon, a peripheral area of the display panel disposed in a recess portion of the first frame, wherein the first frame includes a first frame hole having an opening surrounded on three sides by the first frame, the hole positioned in a middle portion of the first frame adjacent and extending parallel to a supporting portion of the first frame extended between the lens plate and the display panel.

15. The method for producing the display device according to claim 14, further comprising:
   fixing the first frame to the top chassis by a first frame fixing member inserted into the first frame hole.

16. The method for producing the display device according to claim 14, further comprising:
fixing the top chassis unit to the backlight unit by a chassis fixing member.

17. A display device comprising:
a display panel;
a first frame including an opening and covering a peripheral area of the display panel;
a lens plate disposed on the first frame;
a backlight unit supporting a peripheral area of the display panel and providing light; and
a top chassis covering a peripheral area of the lens plate and coupled to the backlight unit,
wherein, the backlight unit comprises:
a light source generating light;
a light guiding member guiding the light to the display panel;
a bottom chassis receiving the light source and the light guiding member, the bottom chassis including a base plate and a sidewall extended from the base plate; and
a second frame positioned between the light guiding member and the display panel and covering a peripheral area of the light guiding member and supporting a peripheral area of the display panel, wherein the second frame contacts an outer surface of the sidewall, wherein a top side of the second frame adjacent the display panel contacts a bottom side of the first frame, wherein the bottom side of the first frame is parallel to a top surface of the light guiding member,
wherein the top chassis comprises:
a first plate facing an upper surface of the first frame; and
a second plate facing a side surface of the first frame.

18. The display device of claim 17, further comprising:
a chassis fixing member fixing the top chassis to the backlight unit.

19. The display device of claim 18, wherein the second frame comprises a portion disposed between the second plate and the sidewall of the bottom chassis and the second frame, the second plate and the sidewall each has a hole having a shape that corresponds to a shape of the chassis fixing member.

20. The display device of claim 17, further comprising a first frame fixing member fixing the first frame to the top chassis.

* * * * *